(12) United States Patent
Macedo

(10) Patent No.: US 6,596,116 B2
(45) Date of Patent: Jul. 22, 2003

(54) METHODS FOR APPLYING DECORATIVE DESIGNS TO A CONTINUOUS LAMINATE

(76) Inventor: Joseph Macedo, 45 Watchung Dr., Basking Ridge, NJ (US) 07920

(*) Notice: Subject to any disclaimer, the term of this patent is extended or adjusted under 35 U.S.C. 154(b) by 57 days.

(21) Appl. No.: 09/930,664

(22) Filed: Aug. 15, 2001

(65) Prior Publication Data
US 2002/0043327 A1 Apr. 18, 2002

Related U.S. Application Data

(60) Provisional application No. 60/227,216, filed on Aug. 23, 2000.

(51) Int. Cl.[7] .................. B44C 1/17; B32B 31/20; B32B 31/12; B41M 8/12; D06P 1/02
(52) U.S. Cl. .............. 156/230; 156/231; 156/240; 156/247; 156/277; 156/289; 156/307.1; 427/148; 428/195; 428/202; 428/207; 428/297.4; 428/306.6; 428/9.4; 8/468; 8/471; 430/126
(58) Field of Search .................. 156/230, 231, 156/240, 247, 277, 289, 272.2, 307.1; 427/146, 147, 148; 428/195, 202, 207, 292.7, 297.4, 304.4, 306.6, 914; 8/468, 471; 430/126, 202

(56) References Cited

U.S. PATENT DOCUMENTS 4,199,317 A * 4/1980 Serex et al. .................. 8/2.5 A
5,302,575 A * 4/1994 Nogawa et al. ............. 503/227
6,249,297 B1 * 6/2001 Lion ........................ 347/171
6,300,279 B1 * 10/2001 Macedo ..................... 503/227

FOREIGN PATENT DOCUMENTS

| CH | 559281 | * 2/1975 | ........... B41F/17/00 |
| FR | 2277672 | * 3/1976 | ........... B32B/27/04 |
| JP | 04-071843 | * 3/1992 | ........... B32B/21/08 |

* cited by examiner

Primary Examiner—Jerry A Lorengo
(74) Attorney, Agent, or Firm—White & Case LLP

(57) ABSTRACT

A process for transferring a decorative sublimation dye design formed on a transfer sheet to a continuous laminate by applying a sheet of cellulose web material impregnated with a thermosetting resin to a surface of a backer sheet to form a pre-laminate. A release sheet is applied to the exposed surface of the sheet of cellulose web material. The transfer sheet bearing the decorative sublimation dye design is applied to the exposed surface of the release sheet. Heat and pressure are applied to the pre-laminate layered with the release and transfer sheets, causing the cellulose web material to seep into the pores of the backer sheet to form a thermofused continuous laminate, and causing the design on the transfer sheet penetrates the thermofused continuous laminate through a sublimation process. The release and transfer sheets are then separated from the thermofused continuous laminate showing the transferred design.

16 Claims, 1 Drawing Sheet

10—Double band press
20—Latex backer sheet—feed end
30—Web conveyor belt
40—Cooling
50—Fully-cured thermofused continuous laminate—collection end
60—Partially-cured polyester impregnated paper—feed end
70—Polyethelene release sheet—feed end
80—Polyethelene release sheet and transfer sheet—collection end
90—Transfer sheet—feed end

METHODS FOR APPLYING DECORATIVE DESIGNS TO A CONTINUOUS LAMINATE

This application claims the benefit of U.S. Provisional Patent Application Ser. No. 60/227,216, filed Aug. 23, 2000.

FIELD OF THE INVENTION

The invention generally relates to methods for applying decorative designs to substrates using sublimation dyes.

BACKGROUND OF THE INVENTION

With the widespread use of substrates in business and in the home, e.g., walls, countertops, furniture, etc., the need for suitably decorating substrates is obvious. It is generally known that substrates can be decorated by applying a decoration, for example, by printing a design on a transfer sheet, bringing the decorated transfer sheet into contact with a substrate, and by the application of heat and pressure, transferring the decoration from the transfer sheet to the surface of the substrate.

Decorative surface papers generally weigh between 60 and 130 grams per square meter. These papers are saturated with reactive resins which are partially cured at the point of manufacture. Final curing is done at the time of hot press lamination when the resin forms a hard crosslinked thermoset material. The paper formation is similar to the sheet used for high pressure laminates. These products are self-bonding, i.e., the resin in the paper flows into the surface of the board during lamination to create a permanent bond.

Two different resin systems may be used to impregnate saturated paper for lamination. In accordance with the first system, melamine is introduced into the paper during an impregnation operation. After the paper is impregnated, it is partially cured using curing ovens. The melamine resin is fully cured at 300–400 psi and 300°–400° F. during hot press lamination. This paper has a definite shelf life that varies with temperature and humidity.

The second resin system employs a polyester resin which is similarly introduced into the paper during an impregnation operation. The paper is heavily impregnated with polyester resin in a dip tank and then partially dried in a drying oven (260°–270° F.). The polyester resin is fully cured at 140 psi and 300°–370° F. during hot press lamination. The dried paper has a definite shelf life that varies with temperature and humidity.

The typical construction of a continuous laminate is a melamine-impregnated, alpha cellulose overlay plus a paper superimposed over one or more phenolic or resin impregnated papers. The laminate is formed on a continuous double band press at temperatures between 275°–300° F. and pressure between 125–175 psi. The thickness of the laminate, which is normally in the $\frac{1}{32}$" range, is ultimately determined by the layers of papers and the resulting amount of resin absorbed. When the sheet is pressed, a steel caul plate is used to create a surface finish ranging from high gloss smooth to fully textured. Continuous laminates can be rolled, but only into larger diameter rolls. The storage of such large diameter rolls is problematic which presents potential inventory related difficulties.

Therefore, there remains a need for a cost-efficient method for the manufacture of decorative thermofused continuous laminates which store easily and cheaply as compact rolls and which can be easily bound to substrates with an adhesive.

Accordingly, the invention provides a practical cost-efficient method for the manufacture of decorative substrates that are advantageously distinguished by an improvement in properties including dyeability, weathering resistance and cleanability. In addition, the invention provides an advantageous method for the manufacture of decorative thermofused continuous laminates which store easily and cheaply as compact rolls and which can be easily bound to substrates with an adhesive. Other advantages of the invention will appear from the following description of the preferred embodiment.

SUMMARY OF THE INVENTION

The present invention relates to a method for transferring a decorative sublimation dye design formed on a transfer sheet to a continuous laminate. In accordance with the method defining the invention, a sheet of cellulose web material impregnated with a thermosetting resin such as, for example, polyester, is applied to a surface of a backer sheet to form a pre-laminate. The polyester impregnated cellulose web material may also include an aluminum oxide. An example of a cellulose web material that may be used in the present invention is paper. Latex is an example of a backer sheet material that may be used in the present invention. A release sheet is then applied to the exposed surface of the sheet of cellulose web material. Polyethelene film with a thickness of about 2 mil is an example of a suitable release sheet material that may be used in the present invention. The transfer sheet bearing the decorative sublimation dye design is applied to the exposed surface of the release sheet.

Heat and pressure are applied to the pre-laminate layered with the release and transfer sheets. The application of heat and pressure causes the cellulose web material to seep into the pores of the backer sheet to form a thermofused continuous laminate, and causes the design on the transfer sheet to penetrate the thermofused continuous laminate through a sublimation process. The thermofusing and sublimation processes occur substantially simultaneously at a temperature ranging from about 325° F. to about 400° F. and a pressure ranging from about 50 psi to about 150 psi. The release and transfer sheets are then separated from the thermofused continuous laminate showing the transferred design.

In another embodiment of the invention, a protective coating such as, for example, a UV cured polyester topcoat, is applied over the surface of the thermofused continuous laminate showing the transferred design. The thus prepared thermofused continuous laminate showing the transferred design is then available for bonding to a substrate such as, for example, plexiglass, glass, PVC, acrylics, cement, wood, engineered wood substrates and plastics with an adhesive.

One of the advantages of the present invention is that the decorative thermofused continuous laminates prepared in accordance with the invention can be used to decorate virtually any substrate by bonding the continuous laminate to the substrate with an appropriate adhesive. Hence, as opposed to the prior art requirement of maintaining an inventory of many different polyester impregnated thermofused substrates of limited shelf lives for the purpose of decorating them with sublimation dyes at a future date, the present invention allows one to simply inventory pre-decorated thermofused continuous laminates which may be stored easily as compact rolls, which have indefinite shelf lives and which may easily be bonded with an adhesive to any one of many different substrates at a future date. Moreover, decoration with sublimation dyes need not be limited to substrates that will not melt or distort under the high temperatures required for the sublimation process since. Advantageously, in accordance with the invention, the substrate need not be present during the laminating process but rather may be bonded to the thermofused continuous laminate after the laminating process has already taken place.

DESCRIPTION OF THE INVENTION

Figure 1:
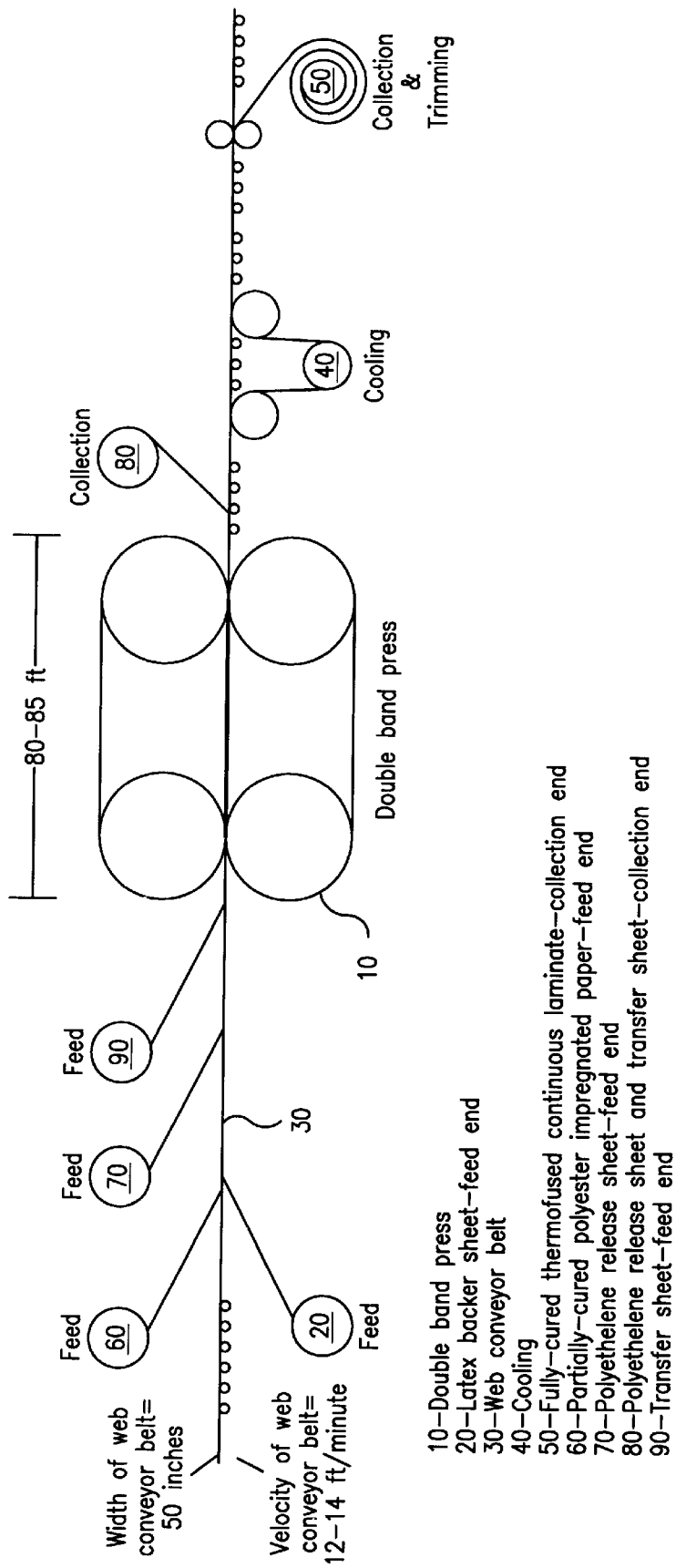
FIG. 1 is a schematic drawing of an embodiment of the invention according to which a sheet of cellulose web material impregnated with a thermosetting resin is consolidated to a backer sheet under heat and pressure using a double band press to form a decorative thermofused continuous laminate.

The present invention relates to a method for transferring a decorative sublimation dye design formed on a transfer sheet to a continuous laminate. Sublimation describes the process through which solids transform directly into gases without going through an intermediate liquid state. Certain dyes undergo this sublimation process when heated. If the gas that results from such dye sublimation can penetrate the surface of a particular material, it is possible to color that material. Moreover, as opposed to simply adding a coat of color film to the surface of the material, the material itself changes to the new color(s).

There are also practical advantages to coloring a material with sublimation dyes as opposed to simply adding a coat of color film to the surface of the material. First, the dye-sublimation method results in more permanent color, as there is no film coat to abrade or fade. Second, the dye-sublimation method does not physically alter the surface of the material as, for instance, adding a coat of color film would. Finally, there is no significant change in the weight of the material colored.

Most sublimation dyes activate, or begin to transform from the solid to the gaseous state, at a temperature of about 250° F. However, at 250° F., the sublimation process would be extremely slow. As the temperature is increased, the conversation to vapors becomes more rapid., becoming nearly instantaneous at 410° F.

In order for the sublimation dyes to deeply color the thermofused substrate, the vapors formed by heating the dyes must be able to penetrate the surface of the thermofused continuous laminate. The thermofused continuous laminate is made penetrable by heating it to its transition temperature. When the thermofused continuous laminate reaches its transition temperature, it expands to form openings that receive the dye. After the sublimation process has occurred and the sublimation dyes have penetrated the surface of the thermofused substrate, the substrate and dyes are allowed to cool. The sublimation dyes solidify and the thermofused substrate regains its original form. The sublimation dyes are now "trapped" inside the pores of the thermofused substrate.

This sublimation process will not be successful if an adequate temperature and pressure are not reached and sustained for a sufficient length of time. Furthermore, different temperatures, pressures and times depending on the type of material which the sublimation dyes must penetrate. Inadequate temperature and pressure for a particular receiving material will preclude penetration of the sublimation dyes. The sublimation dyes will instead remain on the surface of the receiving material, allowing the color to fade, bleed or smear. It is well within the skill of the person of ordinary skill in the art to determine the conditions to successfully complete the sublimation process.

In the accordance with the invention, a design is applied to the surface of a thermofused continuous laminate via transfer from a transfer sheet as opposed to drafting the design directly onto the surface of the thermofused continuous laminate, Specifically, the original drafting of the sublimation dye design is not done on the surface of the thermofused continuous laminate itself Rather, the transfer sheet is used as a carrier of the sublimation dye design. An example of a transfer sheet suitable for this purpose is described in U.S. Pat. No. 4,908,345, issued Mar. 13, 1990 to Egashira et al., which is incorporated herein by reference.

Therefore, in accordance with the method of the invention, a sheet of cellulose web material impregnated with a thermosetting resin is applied to a surface of a backer sheet to form a pre-laminate. A release sheet is applied to the exposed surface of the sheet of cellulose web material. The transfer sheet bearing the decorative sublimation dye design is applied to the exposed surface of the release sheet. Heat and pressure are applied to the pre-laminate layered with the release and transfer sheets. The application of heat and pressure causes the cellulose web material to seep into the pores of the backer sheet to form a thermofused continuous laminate, and causes the design on the transfer sheet to penetrate the thermofused continuous laminate through a sublimation process. Specifically, the sublimation dyes passes through the release sheet and penetrates the thermofused continuous laminate. These thermofusing and sublimation processes occur substantially simultaneously at a temperature of ranging from about 325° F. to about 400° F. and a pressure ranging from about 50 psi to about 150 psi. The release and transfer sheets are then separated from the thermofused continuous laminate showing the transferred design.

Optionally, a protective coating such as, for example, a UV cured polyester topcoat, is applied over the surface of the thermofused continuous laminate showing the transferred design. The thermofused continuous laminate showing the transferred design may be bonded to a substrate such as, for example, plexiglass, glass, PVC, acrylics, cement, wood, engineered wood substrates and plastics with an adhesive.

Examples of materials that may be used in the present invention include, but are not limited to, paper as the cellulose web material, polyester as the thermosetting resin, latex as the backer sheet material, and polyethelene film as the release sheet material.

The steps of the present invention are now described in detail.

Creation of a Thermofused Continuous Laminate

Thermofused continuous laminates formed by the fusion of backer sheets with sheets of cellulose web material impregnated with a thermosetting resin are receptive to sublimation dyes. Therefore, in accordance with the invention, a sheet of cellulose web material impregnated with a thermosetting resin such as, for example, polyester, is applied to at least one surface of a backer sheet. Polyester tends to have performance properties very similar to melamine, a commonly used substance in the design of wood substrates. However, in contrast to melamine, polyester is receptive to image imprinting with sublimation dyes. Table 1 provides the performance measurements of a surface overlaid with polyester in comparison to a surface overlaid with melamine in areas such as resistance to wear, resistance to stain, and cleanability. Specifically, the performance measurements were measured in accordance with NEMA (National Electrical Manufacturers Association) standards for decorative laminates.

A commercial grade of paper impregnated with polyester for use in the invention can be obtained from Olon Industries located in Geneva, Ill. The polyester impregnated paper is commonly referred to as "polyfilm." However, in general, polyester resins are introduced into paper during an impregnation operation. Polyester resins suitable for impregnating sheets of cellulose web material such as paper are formed by reacting di-functional acids with di-functional alcohols. This type of process is well known by those skilled in the art. The polyester resins are heated, for example in a cauldron, to the desired acid number and viscosity. The polyester resins are then dissolved in acetone. Finally, the solution, typically 45–55% polyester, is transferred to a dip tank.

ring to Table 1 again, the addition of aluminum oxide would increase the wear resistance of the polyester-impregnated product to 4,000 to 6,000 cycles. Typically, if it is added, the aluminum oxide would constitute 2–4% of the solution that is transferred to the dip tank.

Referring to FIG. 1, a double band press 10 is illustrated. The double band press is used to apply heat and pressure to bring about thermofusing and sublimation in accordance with the invention. One example of a double band press that is suitable for use in the invention is the Hymmen Press, manufactured by Hymmen, a German company. The use and operation of double band presses of this type is known to those of ordinary skill in the art. Pursuant to the invention,

TABLE 1

| Tests for Resistance to | Test Description | Min. Requirements to Comply with ALA 1992 | | NEMA LD3-1991 GP-20 Min. | | |
| --- | --- | --- | --- | --- | --- | --- |
| | | Solid Colors | Wood Grains | Performance Standards | Polyester | Melamine |
| Wear | A measure of the ability of a decorative overlaid surface to maintain its design or color when subjected to abrasive wear. | 400 cycles | 125 cycles | 400 cycles | Solids-400+ W.G.-125 | Solids-400+ W.G.-125 |
| Scuff | A measure of the ability of a decorative overlaid surface to maintain its original appearance color when exposed to scuffing. | No effect | No effect | No effect | No effect | No effect |
| Stain | A measure of the ability of a decorative overlaid surface to resist staining or discoloration by contact with 29 common household substances. | No effect 1–23 Moderate 24–29 | No effect 1–23 Moderate 24–29 | No effect 1–23 Moderate 24–29 | No effect 1–28 SL effect 29 | No effect 1–28 SL effect 29 |
| Cleanability | A measure of the ability of a decorative overlaid surface to be cleaned using a sponge. | No effect. Surface cleaned in 10 or fewer strokes | No effect. Surface cleaned in 10 or fewer strokes | Slight | No effect | No effect |
| Light (4) | A measure of the ability of a decorative overlaid surface to retain its color after exposure to a light source having a frequency range approximating sunlight. | Slight | Slight | Slight | Slight | Slight |
| High Temp | A measure of the ability of a decorative overlaid surface to maintain its color and surface texture when subject to a high temp. (365 deg. F.) | Slight | Slight | Slight | Slight | Slight |
| Radiant Heat | A measure of the ability of a decorative overlaid surface to resist spot damage when subjected to a radiant heat source. | No effect up to 60 sec. | No effect up to 60 sec. | No effect up to 60 sec. | No effect | No effect |
| Boiling Water | A measure of the ability of a decorative overlaid surface to maintain its color and surface texture when subjected to boiling water. | No effect | No effect | No effect | No effect | No effect |
| Impact | A measure of the ability of a decorative overlaid surface to resist fracture due to spot impact by a steel ball dropped from a measured height. | 15" without fracture | 15" without fracture | 15" without fracture | 15" without fracture | 15" without fracture |

Decorative surface performance measurements as measured by NEMA test procedures.

The paper is saturated by dragging it through the dip tank. The acetone solvent is removed from the saturated paper by passing the saturated paper through a heated oven. Ideally, the polyester resin is metered to a final resin content of 56–60%, but the resin content can be increased or decreased for special applications. Optionally, aluminum oxide can be added to the polyester-acetone solution before it is transferred to the dip tank. Adding aluminum oxide to the solution ultimately results in improved performance measurements, including, increased wear resistance. Refera latex backer sheet is wound around a feed reel 20 and, during the operation of a web conveyor belt 30, the latex backer sheet is extended across the surface of the web conveyor belt 30. The partially cured cellulose web material impregnated with a polyester resin is wound around feed reel 60 and, during operation of the web conveyor belt 30, the web-material is extended on top of the backer sheet. The release sheet is wound around a feed reel 70 and is extended on top of the sheet of cellulose web material through the double band belt press 10. Polyethylene film with a thickness of about 2 mil is an example of a release sheet material that may be used in the present invention. The transfer sheet having the sublimation design is wound around a feed reel 90 and is extended on top of the release sheet.

As illustrated in FIG. 1, reels 20, 60, 70 and 90 feed and reels 40, 50 and 80 pull the various sheets through the double band press 10, wherein the sheets are exposed to heat and pressure. The heat to which the sheets are exposed may range from a temperature of about 325° F. to a temperature of about 400° F., and the pressure may range from about 50 psi to about 150 psi. The application of heat and pressure in the double band press 10 causes the cellulose web material to seep into the pores of the backer sheet to form a thermofused continuous laminate. Simultaneously, the application of heat and pressure in the double band press 10 causes the design on the transfer sheet to pass through the release sheet and penetrate the thermofused continuous laminate through a sublimation process.

The velocity of the web conveyor belt 30 is decreased or increased in order to increase or decrease, respectively, the time during which the sheets are exposed to heat and pressure in the double band press 10. An exemplary temperature-pressure-time combination is a temperature of about 350° F. and a pressure of about 100 psi, and an exposure time of about 7 minutes. Referring again to the double belt press 10 depicted in FIG. 1, an exposure time of 7 minutes would correspond to a web conveyor belt 30 velocity of about 12–14 feet/minute. Of course, those of ordinary skill in the art will know that different kinds of presses of varying lengths and different combinations of temperature, pressure and time can be used to substantially the same effect within the scope of the present invention.

Referring again to FIG. 1, as the transfer sheet and the release sheet pass through the double band press 10, and after the lamination and sublimation processes are complete, the transfer and release sheets are separated from the thermofused continuous laminate showing the transferred design by collection of the sheets onto a collection reel 80. As thermofused continuous laminate bearing the sublimation design passes through the double band press 10, it is cooled in cooling reels 40. After cooling, the thermofused continuous laminate is collected onto a collection reel 50. Once the desired length of thermofused continuous laminate bearing the sublimation design is collected on collection reel 50, it may be trimmed from the double belt press 10 using techniques known to those of ordinary skill in the art.

The invention is particularly advantageous in that it allows for the simultaneous occurrence of thermofusing and sublimation. The simultaneous occurrence of these processes allows for a decreased production time for the creation of thermofused continuous laminates bearing a sublimation design. In contrast to prior art techniques, only one exposure to heat and pressure is required as opposed to a separate exposure for the thermofusing process and a separate exposure for the sublimation process. Additionally, the simultaneous occurrence of thermofusing and sublimation allows for a decreased production cost due to the need for only one exposure to heat and pressure. However, it is also possible to perform the method of the invention wherein the thermofusing process precedes the sublimation process in a separate step.

In another embodiment of the present invention, a protective coating is applied over the surface of the thermofused continuous laminate showing the transferred design. One example of a protective coating suitable for such a purpose is a UV cured polyester topcoat. Table 2 lists the ingredients of such a UV cured polyester topcoat. One such UV cured polyester topcoat can currently be obtained from Seagrave Coatings located in Carlstadt, N.J. The topcoat is commonly referred to as "UV curable acrylate."

TABLE 2

| Chemical Name | CAS Number | Wt. % is less than |
| --- | --- | --- |
| Toluene | 108-88-3 | 10% |
| Styrene Monomer | 100-42-5 | 30% |
| Ethyl Acetate | 141-78 6 | 10% |
| UV Curable Resin | Mixture | 50% |
| Photoinitiator | 7473-98-5 | 5% |

Ingredients of UV cured polyester topcoat obtained from Seagrave Coatings located in Carlstadt, New Jersey.

An advantage of the present invention is that the thermofused continuous laminate bearing the sublimation design may be rolled into tight rolls for easy and simple storage. This advantage is possible with every embodiment of the invention, even if thermofusing and sublimation do not occur simultaneously. The use of a flexible latex backer sheet allows for tighter rolls and the ability to utilize a rotary or drum heat transfer press as an alternative to the slower flat bed press as a means of transferring the sublimation dyes. Accordingly, the decorative thermofused continuous laminates produced in accordance with the invention can be conveniently stored and removed from storage at a future date to be bound to a substrate with an adhesive. Examples of a substrate suitable include plexiglass, glass, PVC, acrylics, cement, wood, engineered wood substrates and plastics. Examples of wood substrates suitable for binding with a thermofused continuous laminate include MDF, plywood, isoboard, veneer core, and particle board, although many other types of wood substrates are also suitable.

What is claimed is:

1. A method for transferring a decorative sublimation dye design formed on a transfer sheet to a continuous laminate comprising:

(a) applying a cellulose web material on a surface of a backer sheet to form a pre-laminate, wherein the cellulose web material is impregnated with a thermosetting resin;

(b) applying a release sheet to the exposed surface of the cellulose web material;

(c) applying the transfer sheet to the exposed surface of the release film;

(d) applying heat and pressure to the pre-laminate layered with the release and transfer sheets, wherein, upon the application of heat and pressure, the cellulose web material seeps into the pores of the backer sheet to form a thermofused continuous laminate and the design on the transfer sheet penetrates the thermofused continuous laminate through a sublimation process; and (e) separating the release and transfer sheets from the thermofused continuous laminate showing the transferred design.

2. The method according to claim 1, wherein thermofusing and sublimation of step (d) occur substantially simultaneously.

3. The method according to claim 1, wherein the sublimation dyes pass through the release sheet and penetrate the thermofused continuous laminate in step (d).

4. The method according to claim 1, wherein the backer sheet is comprised of latex.

5. The method according to claim 1, wherein the cellulose web material is paper.

6. The method according to claim 1, wherein the thermosetting resin is polyester.

7. The method according to claim 1, wherein the cellulose web material is paper and the thermosetting resin is polyester.

8. The method according to claim 1, wherein the polyester impregnated cellulose web material includes an aluminum oxide.

9. The method according to claim 1, wherein the release sheet comprises a polyethelene film.

10. The method according to claim 1, wherein the release sheet has a density of about 2 mil.

11. The method according to claim 1, wherein step (d) occurs at a temperature ranging from about 325° F. to about 400° F. and a pressure ranging from about 50 psi to about 150 psi.

12. The method according claim 1, wherein a protective coating is applied over the surface of the thermofused continuous laminate showing the transferred design.

13. The method according to claim 12, wherein the protective coating comprises a UV cured polyester topcoat.

14. The method according to claim 1, wherein the thermofused continuous laminate showing the transferred design is bonded to a substrate.

15. The method according to claim 14, wherein the substrate comprises a material selected from the group consisting of plexiglass, glass, PVC, acrylics, cement, wood, engineered wood substrates and plastics.

16. The method according to claim 14, wherein the thermofused continuous laminate is bonded to the substrate with an adhesive.

* * * * *